United States Patent [19]

Roter

[11] Patent Number: 5,590,428
[45] Date of Patent: Jan. 7, 1997

[54] AIR PRESSURIZED PERSON SUPPORTING DEVICE WITH VENTILATION

[75] Inventor: Amir Roter, Givatayim, Israel

[73] Assignee: Adelbar Importing and Marketing Ltd., Givatayim, Israel

[21] Appl. No.: 265,684

[22] Filed: Jun. 24, 1994

[51] Int. Cl.⁶ .......................... A47C 27/08; A61G 7/057
[52] U.S. Cl. .......................... 5/726; 5/654; 297/180.13
[58] Field of Search ........................... 5/453, 469, 449, 5/455, 456, 468, 654, 423; 297/180.13, 284.6, 452.41, 452.42

[56] References Cited

U.S. PATENT DOCUMENTS

| | | | |
|---|---|---|---|
| 1,664,636 | 4/1928 | Mayer | 297/180.1 |
| 3,653,083 | 4/1972 | Lapidus . | |
| 3,739,407 | 6/1973 | Stiller | 5/457 |
| 4,279,044 | 7/1981 | Douglas | 5/453 |
| 4,391,009 | 7/1983 | Schild et al. | 5/453 |
| 4,472,847 | 9/1984 | Gammons et al. | 5/453 |
| 4,605,582 | 8/1986 | Sias | 428/120 |
| 4,614,000 | 9/1986 | Mayer | 5/455 |
| 4,631,767 | 12/1986 | Carr et al. | 5/453 |
| 4,662,012 | 5/1987 | Torbet | 5/453 |
| 4,884,304 | 12/1989 | Elkins | 5/453 |
| 4,942,634 | 7/1990 | Saloff et al. | 5/453 |
| 4,945,590 | 8/1990 | Ogura | 5/453 |
| 4,999,867 | 3/1991 | Toivio et al. | 5/453 |
| 5,001,793 | 3/1991 | Liu | 5/455 |
| 5,004,294 | 4/1991 | Lin | 297/180.13 |
| 5,022,110 | 6/1991 | Stroh | 5/455 |
| 5,109,560 | 5/1992 | Uetake | 5/453 |
| 5,113,540 | 5/1992 | Sereboff | 5/449 |

FOREIGN PATENT DOCUMENTS

| | | |
|---|---|---|
| 280213 | 8/1988 | European Pat. Off. . |
| 411375 | 6/1991 | European Pat. Off. . |
| 36341 | 9/1974 | Israel . |
| 1128764 | 10/1965 | United Kingdom . |
| 1186266 | 8/1968 | United Kingdom . |
| WO88/04548 | 6/1988 | WIPO . |
| WO93/24008 | 12/1993 | WIPO . |

Primary Examiner—Alexander Grosz
Attorney, Agent, or Firm—Ladas & Parry

[57] ABSTRACT

A device particularly useful for comfortably supporting a person includes a hollow member having upper and lower walls joined to each other around their periphery and adapted to be air pressurized. The upper wall is formed with a plurality of openings at spaced locations receiving a plurality of valve members, one for each opening. Each valve member is normally biassed to a closed position with respect to its opening, but is engageable by a person supported by the hollow member and is moved thereby to an open position to outlet air from its respective opening.

25 Claims, 5 Drawing Sheets

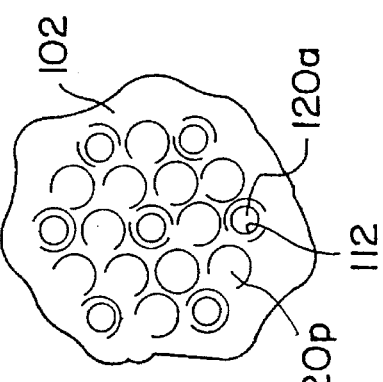
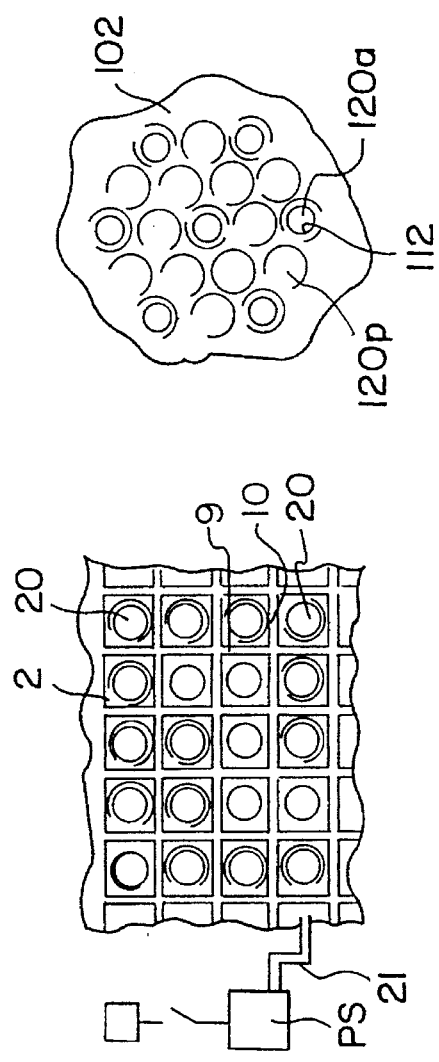
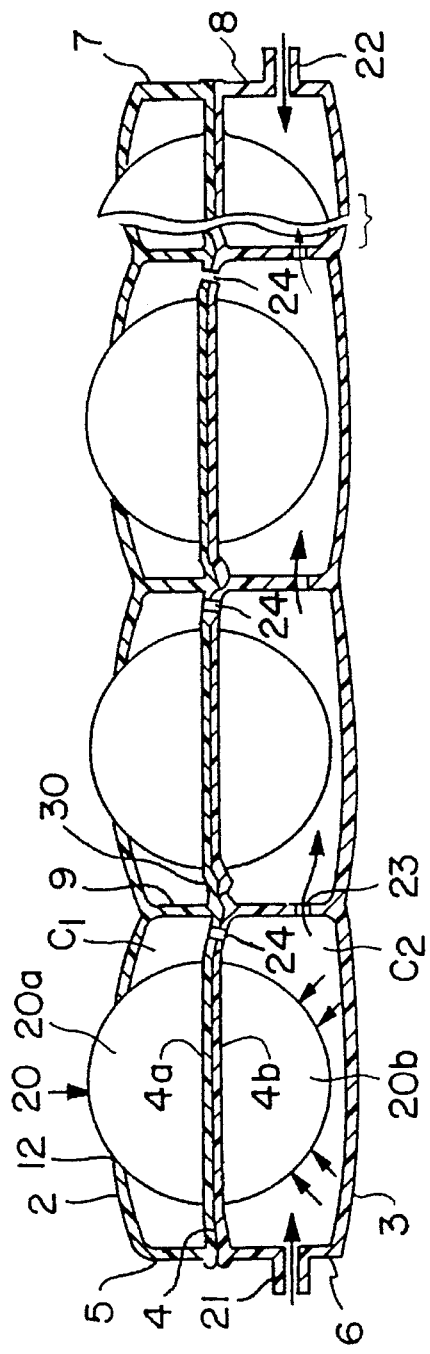

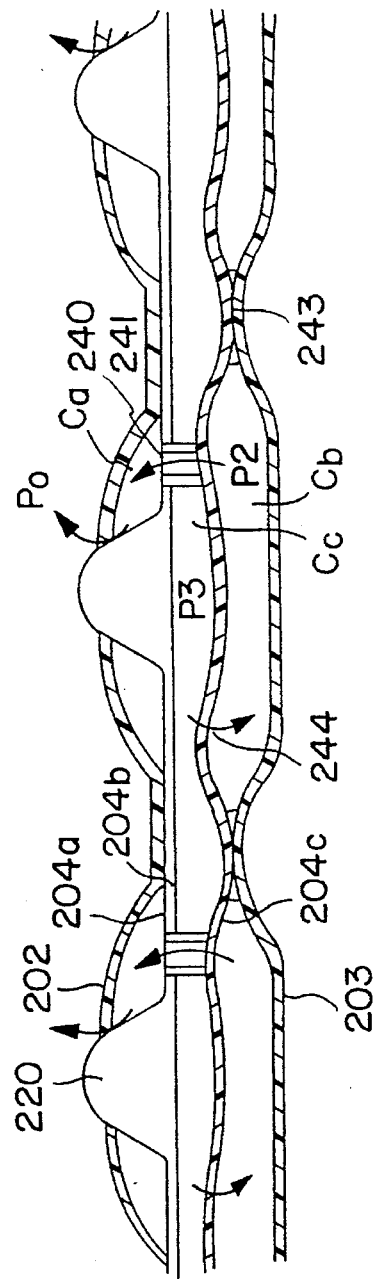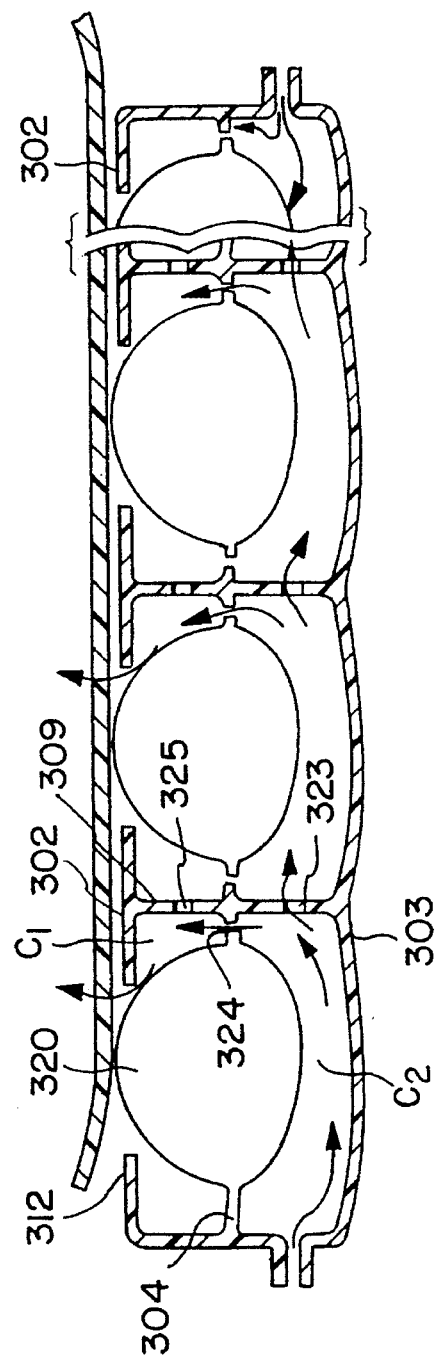

AIR PRESSURIZED PERSON SUPPORTING DEVICE WITH VENTILATION

FIELD AND BACKGROUND OF THE INVENTION

The present invention relates to a supporting device such as a mattress, chair cushion, bedsheet, backrest, etc., for supporting a person in a comfortable manner.

One possible application of the invention is as a mattress for preventing and/or treating bedsores occurring in bedridden patients, particularly elderly or chronically ill persons, who are unable to move themselves and who have to lie in the same position for long periods of time. Many devices have been heretofore proposed to prevent or treat bedsores, but the problem has still not yet been solved satisfactorily. Another possible application of the invention is to provide a comfortable seat and/or backrest for a driver or occupant of an automotive vehicle, aircraft or the like.

BRIEF SUMMARY OF THE INVENTION

According to the present invention, there is provided a device particularly useful for comfortably supporting a person, comprising a hollow member including upper and lower walls joined to each other around their peripheries and adapted to be connected to air pressurizing means for pressurizing the air in the interior of the hollow member. The upper wall is formed with a plurality of openings at spaced locations thereof. The device further includes a plurality of valve members, one for each of the openings, each valve member being normally biassed to a closed position with respect to its opening, but engageable by a person supported by the hollow member and movable to an open position when so engaged, to thereby outlet air from its respective opening between the upper wall and the person.

It will thus be seen that such a supporting device discharges air between the person and the upper wall of the device at every point of pressure applied to the upper wall of the device by the person supported by the device. This discharge of air "softens" the pressure felt by the person at that point. It also circulates air between the device and the occupying person so that the overall effect is to present a more comfortable feeling to the person occupying the device. If desired, the air could be cooled or heated. Also, the upper wall may be made of a flexible sheet material such as to produce a pulsating flow of air, and thereby a massaging effect, through each of the openings opened by the movement of a valve member.

According to the further features in the described preferred embodiments, the openings are circular openings, and the valve members are normally biassed to engage the edges of the circular openings and to project outwardly therethrough. The valve members are movable by the person-applied pressure away from the edges of the circular openings and thereby cause the discharge of air.

In the described preferred embodiments, the valve members are sealed air bubbles formed in a flexible, plastic, bubble sheet disposed between the upper and lower walls and joined thereto along their outer peripheries to define an upper chamber between the upper wall and the bubble sheet, and a lower chamber between the lower wall and the bubble sheet.

According to still further features in the described preferred embodiments, the upper and lower walls are sheets of flexible plastic material. Such a construction produces a cushioning effect thereby further contributing to the comfort of the person occupying the device.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a top, fragmentary view illustrating one form of device constructed in accordance with the present invention;

FIG. 2 is an enlarged longitudinal sectional view illustrating the device of FIG. 1 in its normal condition.

FIG. 4 is a top fragmentary view illustrating another device constructed in accordance with the invention;

FIGS. 6–9 are longitudinal sectional views illustrating still further constructions in accordance with the present invention;

DESCRIPTION OF PREFERRED EMBODIMENTS

Figure 3:
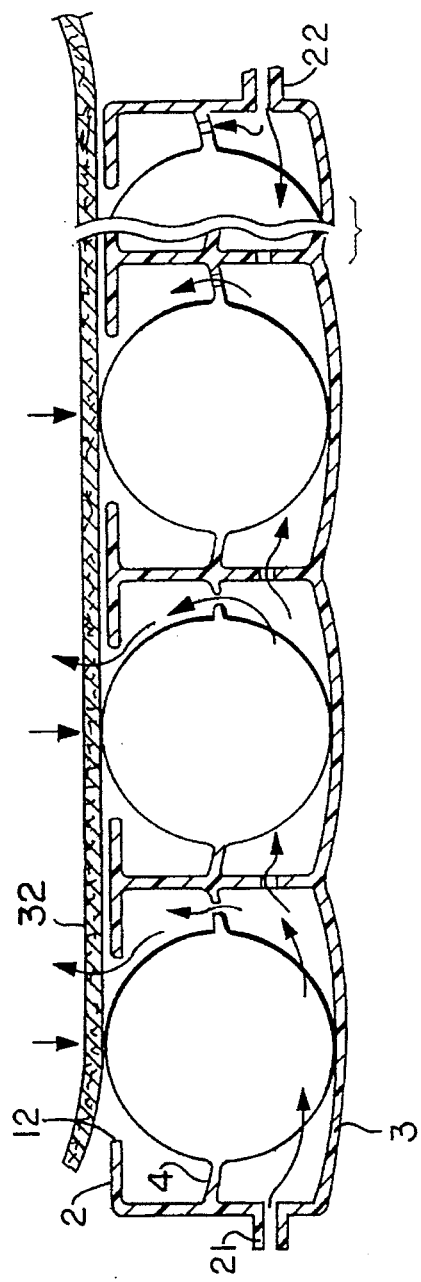
FIG. 3 is a view similar to that of FIG. 2 but illustrating the device in the condition when occupied by a person.

The Embodiment of FIGS. 1–3

The device illustrated in FIGS. 1–3 of the drawings is intended for use as a mattress, bedsheet, or chair cushion to support a person occupying the device in a comfortable manner. Thus, as best seen in FIG. 2, the device includes a hollow member having an upper wall 2, a lower wall 3, and an intermediate wall 4, all of flexible, plastic sheet material. The upper wall 2 and the lower wall 3 are each of single-layered sheets, but intermediate wall 4 is a lamination of two sheets 4a, 4b. All the sheets are joined along their outer peripheries, as shown at 5, 6 and 7, 8 in FIG. 2, so as to define an upper chamber between the upper sheet 2 and the intermediate sheet 4, and a lower chamber between the lower sheet 3 and the intermediate wall 4. In addition, the upper sheet 2 and lower sheet 3 are joined to the intermediate wall 4 along longitudinal and transverse partition lines, as shown at 9 and 10, respectively, FIG. 1, thereby dividing the upper compartment into a plurality of upper cells $C_1$, and the lower compartment into a plurality of lower cells $C_2$, all of substantially square configuration.

The upper sheet 2 is formed with a plurality of circular openings 12, one located centrally each of the upper cells $C_1$. The intermediate laminated sheet is a flexible bubble sheet constituted of two sheets 4a, 4b, each embossed with a plurality of semi-spherical cavities 20a, 20b, and laminated together to define a plurality of sealed, spherical air bubbles 20. The upper half of each air bubble 20, defined by the semi-spherical cavity 20a formed in sheet 4a, is aligned with and projects slightly through a circular opening 12 in the upper sheet 2. The lower half of each air bubble 20, defined by the semi-spherical cavity 20b in sheet 4b, is wholly enclosed within the respective lower cell $C_2$.

Peripheral wall 6 of the lower cells $C_2$ includes an inlet 21 for inletting pressurized air from a source indicated at PS in FIG. 1. If desired, the opposite end of the device may also include an inlet 22 for inletting pressurized air into the lower cells $C_2$. The partitions 9 between the lower cells $C_2$ include small holes 23 establishing communication between the lower cells and thereby equalizing the pressure in all the lower cells.

The laminated bubble sheet 4 is also formed with small holes 24 so as to establish communication between the upper cells $C_1$ and the lower cells $C_2$, thereby also tending to equalize the pressure in these two groups of cells.

The device illustrated in FIGS. 1-3 operates as follows:

When the inlets 21, 22 are connected to a source of pressurized air, the increase in pressure is transmitted to all the lower cells $C_2$ via the openings 23 in the partitions 10, so that the pressure in all the lower cells $C_2$ increases above atmospheric pressure. In addition, the increased pressure in the lower cells $C_2$ is communicated to the upper cells $C_1$ by the small holes 24 in the bubble sheet 4.

The positive pressure in the lower cells $C_2$ is applied over a larger surface of the bubble sheet 4 than the positive pressure in the upper cells $C_1$ and thus biasses the bubble sheet 4 towards the upper sheet 2 to press its bubbles 20 firmly against the inner edge of the circular openings 12 in the upper sheet 2. Thus, the bubbles 20 act as valve members normally biassed to close the circular openings 12 in the upper sheet 2, and thereby to block the discharge of air from the upper cells $C_1$.

When the illustrated device is used as a mattress, bedsheet, chair cushion or the like to be occupied by a person, the weight of the person applies pressures to the portions of the bubbles 20 projecting through the circular openings 12 and presses these bubbles inwardly away from the inner edges of the circular openings 12 in the upper sheet 2. The pressurized air within the upper cells $C_1$ is thus discharged from each such opening 12. The small holes 24 formed in the bubble sheet 4 tend to replenish the air discharged from the upper cells $C_1$ with air from the lower cells $C_2$ according to a rate as determined by the size of the holes 24.

When the person shifts a pressure point from one bubble 20 to another, the bubble relieved of the pressure moves back to close its circular opening 12, whereas the bubble to which the pressure has now been applied moves to open its respective opening 12 and thereby to discharge air at that pressure point. The pressure within the upper cell $C_1$ at the relieved pressure point then restores to its normal value because of the openings 24 in the bubble sheet 4, so that cell is now available to discharge air the next time pressure is applied to its bubble 20.

The overall effect is to cause a discharge of air at each point of contact of the person with the upper wall 2 of the device. This produces a "softer feeling" at these points of contact, and also circulates air between the person and the device at each of the contact points. If desired, this air may be heated in the winter time or cooled in the summer time.

Moreover, because of the flexible nature of the upper sheet 2, it is believed that a somewhat pulsative flow of the air through the openings opened by the bubbles 20 will be produced. Thus, as a bubble 20 is moved inwardly away from its respective opening, the air will flow through the opening to produce a low pressure within the respective upper cell $C_1$; this will draw the edges of the sheet back against the bubble to temporarily interrupt the flow, thereby producing a "fluttering" effect of the sheet edge with respect to the bubble. Such a pulsative flow of the air through the openings will result in a desirable "massaging" effect at each point of contact of the person's body with the upper wall 2.

If desired, the bubble sheet 4 may be produced so as to provide a particularly resilient juncture with the bubble 20, as shown by the folds or corrugations at 30 in FIG. 2, and thereby to permit a larger and easier displacement of the bubble when subjected to pressure. In addition, the upper sheet 2, and the portion of the bubbles 20 projecting through its circular openings 12, may be covered by a towel or other porous sheet, as shown by sheet 32 in FIG. 3, to permit the gas within the upper cells $C_1$ to be discharged outwardly even though the occupant's body may physically close some of the circular openings 12 in the upper sheet 2.

Figure 5:
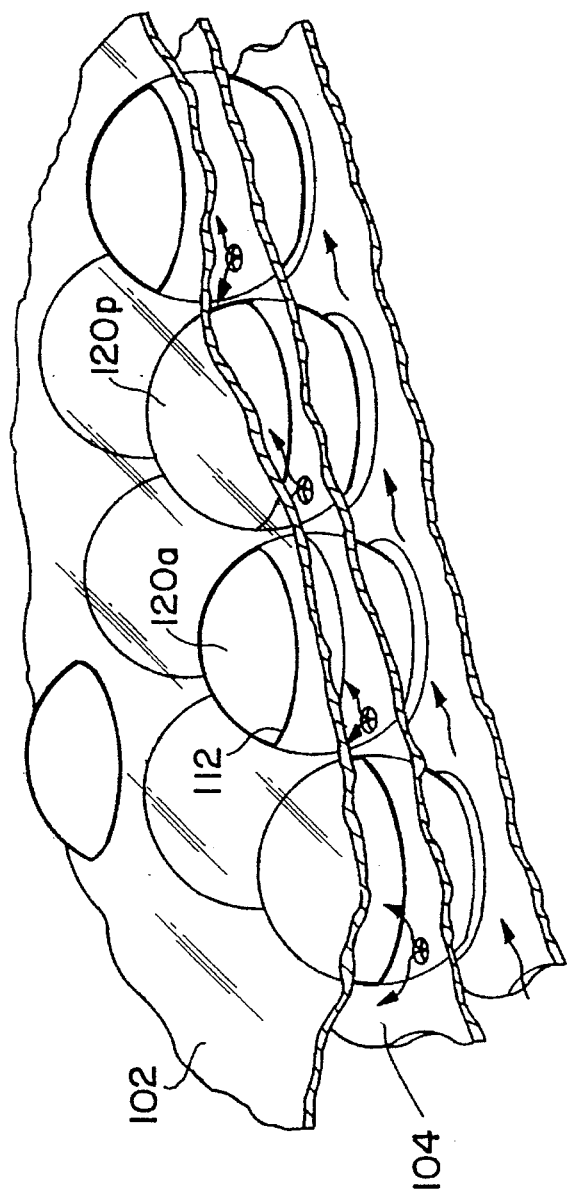
FIG. 5 is an enlarged perspective view more particularly illustrating the structure of the device of FIG. 4.

The Embodiment of FIGS. 4 and 5

FIGS. 4 and 5 illustrate a variation, wherein the bubble sheet, therein designated 104, is formed with a plurality of active bubbles, designated 120a, and also with a plurality of passive bubbles, designated 120p. The active bubbles 120a project through circular openings 112 in the upper sheet 102 to serve as valve members for controlling the flow of air from the upper cells, in the same manner as described above with respect to FIGS. 1-3. The upper sheet 102, however, does not include circular openings aligned with the passive bubbles 120p, so that these passive bubbles merely serve to space the bubble sheet 104 from the upper sheet 102, and thereby to enhance the cushioning effect produced by the device.

The Embodiment of FIG. 6

FIG. 6 illustrates a further construction, also including two outer sheets 202, 203 similar to sheets 2 and 3 in FIGS. 1-3, but in this case the intermediate wall is made of a bubble sheet consisting of three laminated sheets 204a and 204b (shown schematically) and 204c (shown in section). Sheet 204a is embossed with semi-spherical cavities, but neither of the other two sheets 204b, 204c is so embossed, so that the bubble sheet defines semi-spherical bubbles as shown at 220.

All three layers 204a–204c of the bubble sheet 204 are bound together along longitudinal and transverse partition lines, as shown at 240 and are provided with passageways as shown at 241 through these bonded areas. In addition, the outer sheet 202 is bonded to layers 204a and 204b of the bubble sheet 204 along longitudinal and transverse partition lines, as shown at 242. Further, the lower sheet 203 and the lower layer 204c of the bubble sheet are bonded together along the longitudinal and tranverse partition lines as shown at 243. Such a construction thus defines three groups of cells, namely cells Ca between sheets 202 and 204a, cells Cb between sheets 203 and 204c, and cells Cc between sheets 204b and 204c. Communication is established between cells Cb and Cc by openings 244 formed in sheet 204c; and communication is established between cells Cb and Ca by openings 241 formed in the bond lines 240.

The pressurized air is applied to cells Cc and is communicated to cells Cb via holes 244, and to cells Ca via passageways 241.

The structure and operation of the device illustrated in FIG. 6 are otherwise the same as described above with respect to FIGS. 1-3.

The Embodiment of FIG. 7

FIG. 7 illustrates a construction similar to that of FIGS. 1-3, including an upper sheet 302, a lower sheet 03, and an intermediate bubble sheet 304. In the construction illustrated in FIG. 7, the bubble sheet 304 is formed with substantially semi-spherical bubbles 320, rather than spherical bubbles, such that the lower portions of the bubble 320 within the lower cells $C_2$ are spaced from the lower sheet 303, rather than engaging the lower sheet.

Another difference in the construction of FIG. 7 is that the partitions 309 dividing the upper chamber into the upper cells $C_1$ are formed with small openings 325 in order to establish communication between all the upper cells $C_1$, and thereby to equalize the pressure in those cells when their bubbles 320 are in the closed position with respect to the openings 312.

The construction illustrated in FIG. 7 also includes the openings 323 in the partitions 309 establishing communication between the lower cells $C_2$, and the openings 324 in the bubble sheet 304 establishing communication between the upper cells $C_1$ and the lower cells $C_2$, and otherwise operates in substantially the same manner as described above with respect to FIGS. 1–3.

Figure 8:
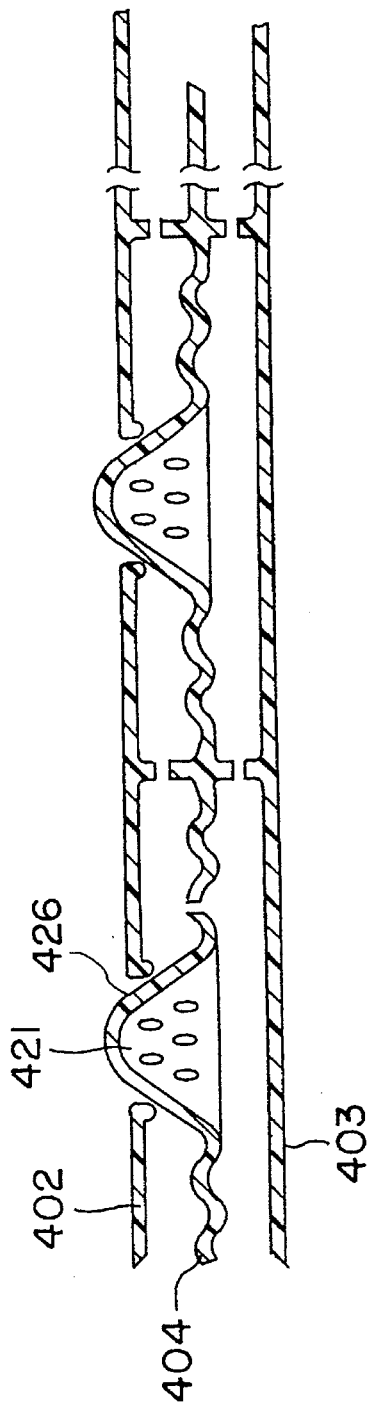

The Embodiment of FIG. 8

FIG. 8 illustrates a construction similar to that of FIG. 7, including an upper flexible sheet 402, a lower flexible sheet 403, and an intermediate sheet 404 carrying the bubbles 420 acting as valves for opening and closing the openings 412 in the upper sheet 402. In this case, however, the bubbles 420 are filled with a spongy elastomeric foam 421, rather than with air. The construction of FIG. 8 is otherwise the same, and operates in substantially the same manner, as in FIG. 7.

Figure 9:
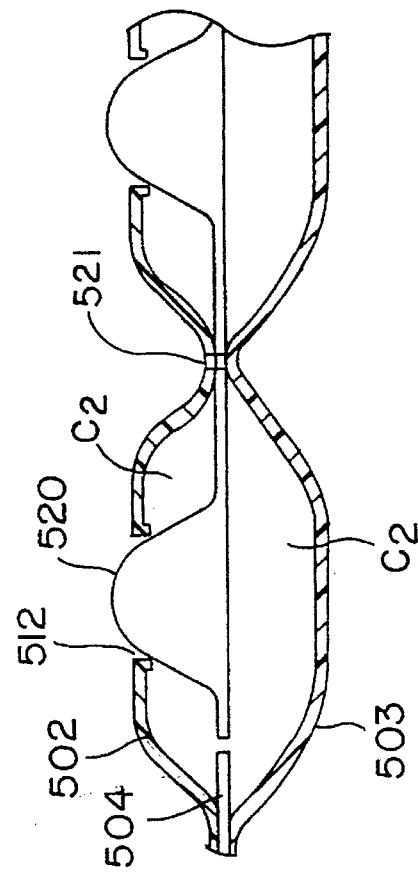
Figure 10:
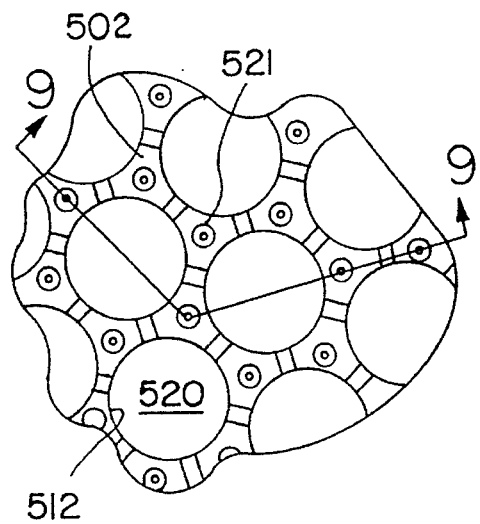
FIG. 10 is a top fragmentary view illustrating the section of FIG. 9 on line 9—9.

The Embodiment Of FIGS. 9 and 10

The embodiment of FIGS. 9 and 10 also includes semi-spherical bubbles 520 formed in the intermediate sheet 504 for closing the openings 512 in the upper sheet 502 and spaced from the lower sheet 503. Bubbles 520 may be filled with air, as in FIG. 7, or with an elastomeric spongy material as shown at 421 in FIG. 8. In the construction illustrated in FIGS. 9 and 10, however, the partitions 504 defining the upper cells $C_1$ and $C_2$ are not in the form of continuous weld lines, as in FIG. 1 for example, but rather are in the form of spot welds, as shown at 521. Such a construction thus produces passageways between the spot welds interconnecting the upper cells $C_1$ with each other, and the lower cells $C_2$ with each other.

Figure 11:
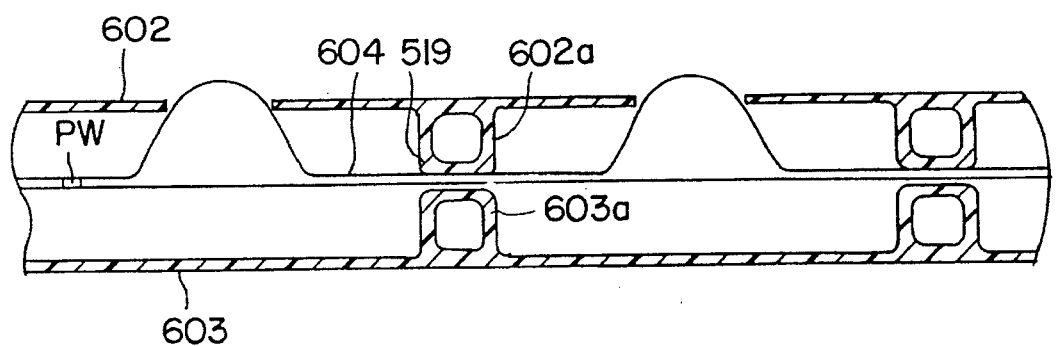
FIGS. 11 and 12 are longitudinal sectional views illustrating still further constructions in accordance with the present invention.
Figure 12:
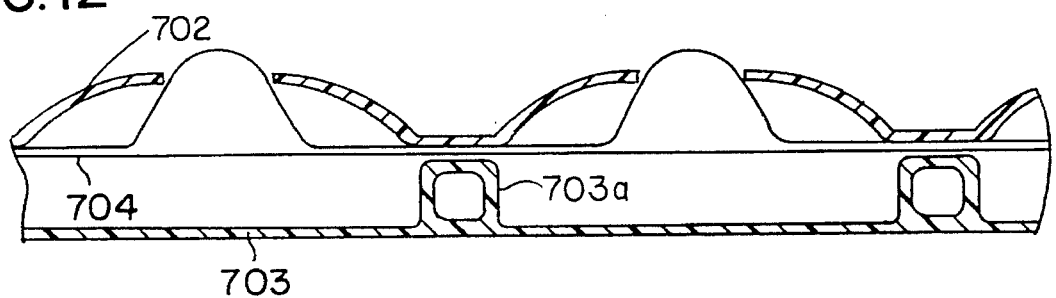

The Embodiment of FIGS. 11 and 12

FIG. 11 illustrates a construction, also including an upper plastic sheet 602, a lower plastic sheet 603, and an intermediate bubble sheet 604. In the construction of FIG. 11, however, the upper plastic sheet 602 is also a bubble sheet and is formed with closed bubbles 602a engageable with the intermediate bubble sheet 604 for spacing the intermediate bubble sheet from the upper bubble sheet. In addition, the lower plastic sheet 603 is also a bubble sheet, being formed with closed bubbles 603a for spacing the intermediate bubble sheet from the lower sheet.

The construction illustrated in FIG. 12 is similar to that of FIG. 11, except that of the upper and lower sheets 702, 703, only the lower sheet 703 is in the form of a bubble sheet, being formed with closed bubbles 703a, for spacing it from the intermediate bubble sheet 704.

The constructions illustrated in FIGS. 11 and 12 are otherwise substantially the same, and operate in substantially the same manner, as described above.

While the invention has been described with respect to a number of preferred embodiments, it will be appreciated that many other variations may be made. For example, the lower sheet (3 or 203) may be constituted of two laminated films embossed with passageways defining distributor ducts for distributing the pressurized air throughout the lower cells $C_2$. In addition, the partitions (e.g., 9 and 10, FIGS. 1–3) may define cells of various configurations, e.g., circular, hexagonal, etc., other than the square configuration illustrated in the drawings. The pressurized air applied to the inlets 21, 22 may be from any high pressure source, such as an air pressure line, a blower, or a pressurized air tank.

Many other variations, modifications and applications will be apparent.

What is claimed is:

1. A device particularly useful for comfortably supporting a person, comprising:

a hollow member including upper and lower walls having peripheries, said peripheries being joined to each other, and connectable to air pressuring means for pressuring air in the interior of said hollow member, said upper wall being made of a flexible material and formed with a plurality of openings at spaced locations thereof; and a plurality of valve members respectively for said openings, each valve member being normally biased to a closed position with respect to its opening, but, when a person is supported by said hollow member, are movable to an open position for discharging air from its opening between said upper wall and said person, wherein said valve members project from an intermediate flexible plastic sheet disposed between said upper and lower walls and are joined thereto along outer peripheries to define at least one upper chamber between said upper wall and said intermediate sheets, and at least one lower chamber between said lower wall and said intermediate sheet.

2. The device according to claim 1, wherein said openings are circular openings, and said valve members are normally biassed to engage edges of said circular openings and to project outwardly therethrough, said valve members being engageable by said person and movable away from the edges of said circular openings and thereby to outlet air therethrough.

3. The device according to claim 1, wherein said valve members are sealed air bubbles formed in said intermediate flexible plastic sheet.

4. The device according to claim 3, wherein said intermediate flexible plastic sheet comprises first and second layers at least said first layer being embossed with a plurality of semi-spherical cavities and said layers being laminated together to define said air bubbles.

5. The device according to claim 4, wherein said second layer is also embossed with a plurality of semi-spherical cavities, whereby the laminated layers define a plurality of spherical air bubbles.

6. The device according to claim 5, wherein said intermediate flexible plastic sheet normally spaces said air bubbles from said lower wall but is flexible enough for said air bubbles to engage with said lower wall when said valve members are moved to said open position.

7. The device according to claim 4, wherein only said first layer is embossed with said plurality of semi-spherical cavities, whereby said air bubbles are semi-spherical and said second layer is non-embossed.

8. The device according to claim 7, wherein said intermediate flexible plastic sheet further comprises a third layer bonded to said second, non-embossed layer at discrete locations on a side of said second layer opposite to said first layer, said discrete bonding locations being formed with passageways establishing communication between said upper and lower chambers.

9. The device according to claim 1, further including an inlet to said lower chamber connectible to said air pressurizing means for pressurizing the air therein; said intermediate sheet also including a plurality of small holes establishing communication between said upper and lower chambers tending to equalize the pressure therein when said valve members are in their closed positions with respect to the openings in said upper wall.

10. The device according to claim 1, wherein said intermediate sheet is formed with a plurality of passive air bubbles serving as spacing elements to space said intermediate sheet from said lower wall.

11. The device according to claim 1, in combination with air pressurizing means for providing said pressurizing air.

12. The device according to claim 1, wherein said valve members are caps formed in a flexible intermediate plastic sheet disposed between said upper and lower walls and joined thereto to define said upper and lower chambers.

13. A device particularly useful for comfortably supporting a person, comprising:
 a hollow member including upper and lower walls having peripheries, said peripheries being joined to each other, and means connectable to pressurizing air for pressurizing air in an interior of said hollow member, said upper wall being formed with a plurality of openings at spaced locations thereof; and
 a plurality of valve members respectively for said openings, each valve member being normally biased to a closed position with respect to its opening, but engageable by a person supported by said hollow member and movable to an open position when so engaged for discharging air from its opening between said upper wall and said person,
 wherein said valve members are sealed air bubbles formed in a flexible, plastic, intermediate bubble sheet disposed between said upper and lower walls and joined thereto along outer peripheries to define an upper chamber between said upper walls and said bubble sheet, and a lower chamber between said lower wall and said bubble sheet.

14. The device according to claim 13, wherein said upper wall is made of a flexible sheet material such as to produce a pulsating flow of air through each of said openings opened by the movement of a valve member.

15. The device according to claim 14, wherein said lower wall is a sheet of flexible plastic material.

16. The device according to claim 13, wherein said upper and lower walls are also joined to said intermediate plastic bubble sheet along a plurality of lines of partitions to divide said upper and lower chambers into a plurality of cells.

17. The device according to claim 16, wherein said partitions include openings to equalize the air pressure in the cells of said lower chamber.

18. The device according to claim 16, wherein said partitions include openings to equalize the air pressure in the cells of said upper chambers.

19. The device according to claim 16, wherein said partitions are defined by spot welds between said upper and lower plastic sheets and said intermediate bubble sheet, producing passageways between the spot welds interconnecting said upper cells with each other and said lower cells with each other.

20. The device according to claim 16, wherein said upper plastic sheet is also a bubble sheet and is formed with closed bubbles engageable with said intermediate bubble sheet.

21. The device according to claim 16, wherein said lower sheet is also a bubble sheet and is formed with closed bubbles engageable with said intermediate bubble sheet.

22. The device according to claim 13, wherein said openings are circular openings, and said valve chambers are normally biassed to engage edges of said circular openings and to project outwardly therethrough, said valve members being engageable by said person and movable away from the edges of said circular openings and thereby to outlet air therethrough.

23. The device according to claim 13, further including an inlet to said lower chamber connectible to said air pressurizing means for pressurizing the air therein; said intermediate bubble sheet also including a plurality of small holes establishing communication between said upper and lower chambers tending to equalize the pressure therein when said sealed air bubbles are in their closed positions with respect to the openings in said upper wall.

24. The device according to claim 13, wherein said bubble sheet is formed with a plurality of active air bubbles each serving as one of said valve members cooperable with one of said openings in said upper wall, and a plurality of passive air bubbles serving as spacing elements to space said bubble sheet from said lower wall.

25. The device according to claim 13, in combination with air pressurizing means for providing said pressurizing air.

* * * * *